United States Patent
Kim et al.

(10) Patent No.: US 8,305,977 B2
(45) Date of Patent: Nov. 6, 2012

(54) APPARATUS AND METHOD FOR RELOCATING PERSISTENTLY ALLOCATED RESOURCE IN A BROADBAND WIRELESS COMMUNICATION SYSTEM

(75) Inventors: Se-Ho Kim, Seoul (KR); Chang-Yoon Oh, Yongin-si (KR); Jun-Sung Lim, Seoul (KR); Hee-Won Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 581 days.

(21) Appl. No.: 12/493,476

(22) Filed: Jun. 29, 2009

(65) Prior Publication Data
US 2009/0323620 A1  Dec. 31, 2009

(30) Foreign Application Priority Data
Jun. 30, 2008  (KR) .......................... 10-2008-0062530

(51) Int. Cl.
H04W 4/00  (2009.01)
H04B 7/212  (2006.01)
(52) U.S. Cl. ........................................ 370/329; 370/337
(58) Field of Classification Search ........... 370/310–350
See application file for complete search history.

(56) References Cited

U.S. PATENT DOCUMENTS

| 2006/0285523 A1* | 12/2006 | Ishii et al. ..................... 370/335 |
| 2009/0137253 A1* | 5/2009 | Shrivastava et al. .......... 455/450 |
| 2009/0268645 A1* | 10/2009 | Chindapol et al. ............ 370/329 |
| 2010/0020758 A1* | 1/2010 | Kim et al. ...................... 370/329 |
| 2010/0177717 A1* | 7/2010 | Sung et al. ..................... 370/329 |
| 2010/0284348 A1* | 11/2010 | Kashima et al. ............... 370/329 |

FOREIGN PATENT DOCUMENTS

| KR | 10-2006-0037101 A | 5/2006 |
| KR | 10-2007-0062757 A | 6/2007 |
| KR | 10-2007-0080735 A | 8/2007 |

* cited by examiner

*Primary Examiner* — Warner Wong
(74) *Attorney, Agent, or Firm* — Jefferson IP Law, LLP (57) ABSTRACT

Apparatuses of a base station and terminal in a wireless communication system and their operating methods are provided. An operating method of a base station in a broadband wireless communication system includes determining whether to relocate at least one persistently allocated resource, when it is determined to relocate the at least one persistently allocated resource, relocating the at least one persistently allocated resource, generating a resource relocation Information Element (IE) indicative of the resource relocation using an offset of a Resource Block (RB), and transmitting the resource relocation IE.

26 Claims, 9 Drawing Sheets

: EMPTY RESOURCE REGION

APPARATUS AND METHOD FOR RELOCATING PERSISTENTLY ALLOCATED RESOURCE IN A BROADBAND WIRELESS COMMUNICATION SYSTEM

PRIORITY

This application claims the benefit under 35 U.S.C. §119(a) of a Korean patent application filed in the Korean Intellectual Property Office on Jun. 30, 2008 and assigned Serial No. 10-2008-0062530, the entire disclosure of which is hereby incorporated by reference.

BACKGROUND OF THE INVENTION

1. Field of the Invention

The present invention relates to a broadband wireless communication system. More particularly, the present invention relates to an apparatus and a method for relocating a persistently allocated resource in the broadband wireless communication system.

2. Description of the Related Art

A 4th Generation (4G) communication system, which is a future-generation communication system, aims to provide users with services of various Quality of Service (QoS) levels at a transfer rate of about 100 Mbps. Its representative examples include an Institute of Electrical and Electronics Engineers (IEEE) 802.16 communication system. The IEEE 802.16 communication system adopts an Orthogonal Frequency Division Multiplexing (OFDM)/Orthogonal Frequency Division Multiple Access (OFDMA) scheme to support a broadband transmission network in physical channels.

In the broadband wireless communication system such as the IEEE 802.16 system, a base station allocates resources to terminals to transmit and receive packets. The base station transmits a MAP message indicative of the resource allocation result such as location, size, modulation scheme, and coding rate of the allocated resource, to the terminal over a downlink channel. A message indicative of the resource allocation information for uplink communication and a message indicative of the resource allocation result for downlink communication are separately constituted. The unit of the information required for one resource information is referred to as a MAP Information Element (IE).

The resource allocation targets the resources in a certain region. Since general data packets are allocated at regular intervals, the related MAP IE is transmitted at the regular intervals. In the case of Voice over Internet Protocol (VoIP) service or synchronous Hybrid Automatic Repeat reQuest (HARQ) with periodic packet transmission, the transmission of the MAP IE in every packet delivery causes an unnecessary waste of resources. Accordingly, the packet of the periodic transmission period, such as VoIP packet or synchronous HARQ packet, can adopt a fixed allocation scheme which reduces the waste of the resources in the MAP IE by persistently allocating the resources. According to the fixed allocation, in the downlink communication, the MAP IE and the packet are transferred only at the initial resource allocation and then the packet is transmitted without the MAP IE. Hence, the terminal using the persistently allocated resource continues to use the persistently allocated resource without the MAP IE until allocation release information or allocation change information is received.

Figure 1:
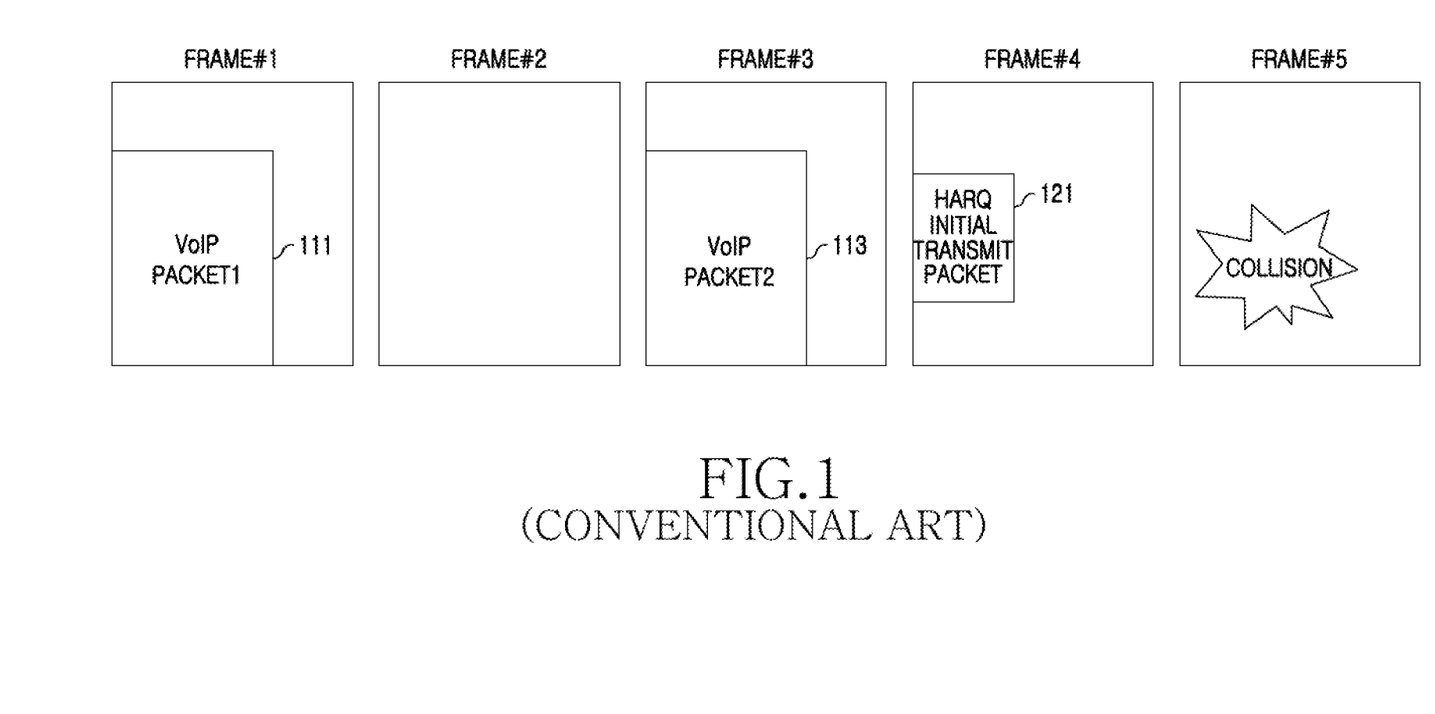
FIG. 1 illustrates a collision between persistently allocated resources in a broadband wireless communication system according to the conventional art.

If the transmission periods of the synchronous HARQ packet and the VoIP packet are different from each other, the persistently allocated resources may collide with each other. For example, given the VoIP packet in a two-frame period and the synchronous HARQ packet in a one-frame period, the packets collide with each other as illustrated in FIG. 1. FIG. 1 illustrates a collision between persistently allocated resources in a broadband wireless communication system according to the conventional art. In FIG. 1, the first VoIP packet 111 is transmitted in a frame #1. After the period of the VoIP packet passes by, a second VoIP packet 113 is transmitted in a frame #3. Next, in a frame #4, a HARQ initial transmit packet 121 is transmitted using the resource at the same location as the resource used for the first VoIP packet 111 and the second VoIP packet 113. It is assumed that the reception of the HARQ initial transmit packet 121 fails. Hence, in a frame #5, it is necessary to retransmit a packet for the HARQ initial transmit packet 121. Simultaneously, a third VoIP packet needs to transmit as well in the frame #5. That is, the resources for retransmitting the packet and transmitting the third VoIP packet are subject to the collision.

As discussed above, when the fixed allocation of the different periods is applied to the broadband wireless communication system, the collision between the resources can occur. As a result, the terminals cannot successfully receive the packets. Thus, what is needed is a method for preventing the collision between the persistently allocated resources.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for preventing collision between resources persistently allocated in a broadband wireless communication system.

Another aspect of the present invention is to provide an apparatus and a method for relocating a persistently allocated resource in a broadband wireless communication system.

Yet another aspect of the present invention is to provide an apparatus and a method for removing an empty resource region between resources persistently allocated in a broadband wireless communication system.

Still another aspect of the present invention is to provide an apparatus and a method for supplying an empty resource region in a necessary size by relocating resources persistently allocated in a broadband wireless communication system.

In accordance with an aspect of the present invention, a method of a base station in a broadband wireless communication system is provided. The method includes determining whether to relocate at least one persistently allocated resource, when it is determined to relocate the at least one persistently allocated resource, relocating the at least one persistently allocated resource, generating a resource relocation Information Element (IE) indicative of the resource relocation using an offset of a Resource Block (RB), and transmitting the resource relocation IE.

In accordance with another aspect of the present invention, a method of a terminal in a broadband wireless communication system is provided. The method includes determining whether a MAP message comprises a resource relocation IE indicative of a resource relocation using an offset of an RB, reading resource relocation information of at least one persistently allocated resource using the resource relocation IE, and determining whether the persistently allocated resource being relocated is a resource of the terminal.

In accordance with yet another aspect of the present invention, an apparatus of a base station in a broadband wireless communication system is provided. The apparatus includes an allocator for determining whether to relocate at least one persistently allocated resource and for relocating the at least one persistently allocated resource when it is determined to relocate the at least one persistently allocated resource, a generator for generating a resource relocation IE indicative of the resource relocation using an offset of an RB, and a transmitter for transmitting the resource relocation IE.

In accordance with still another aspect of the present invention, an apparatus of a terminal in a broadband wireless communication system is provided. The apparatus includes a decoder for determining whether a MAP message comprises a resource relocation IE indicative of a resource relocation using an offset of an RB, an analyzer for reading resource relocation information of at least one persistently allocated resource using the resource relocation IE, and a manager for determining whether the persistently allocated resource being relocated is a resource of the terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technique for preventing a collision between resources persistently allocated in a broadband wireless communication system. Hereinafter, an Orthogonal Frequency Division Multiplexing (OFDM)/Orthogonal Frequency Division Multiple Access (OFDMA) wireless communication system is illustrated by way of example. Note that the present invention is applicable to other wireless communication systems.

Figure 2:
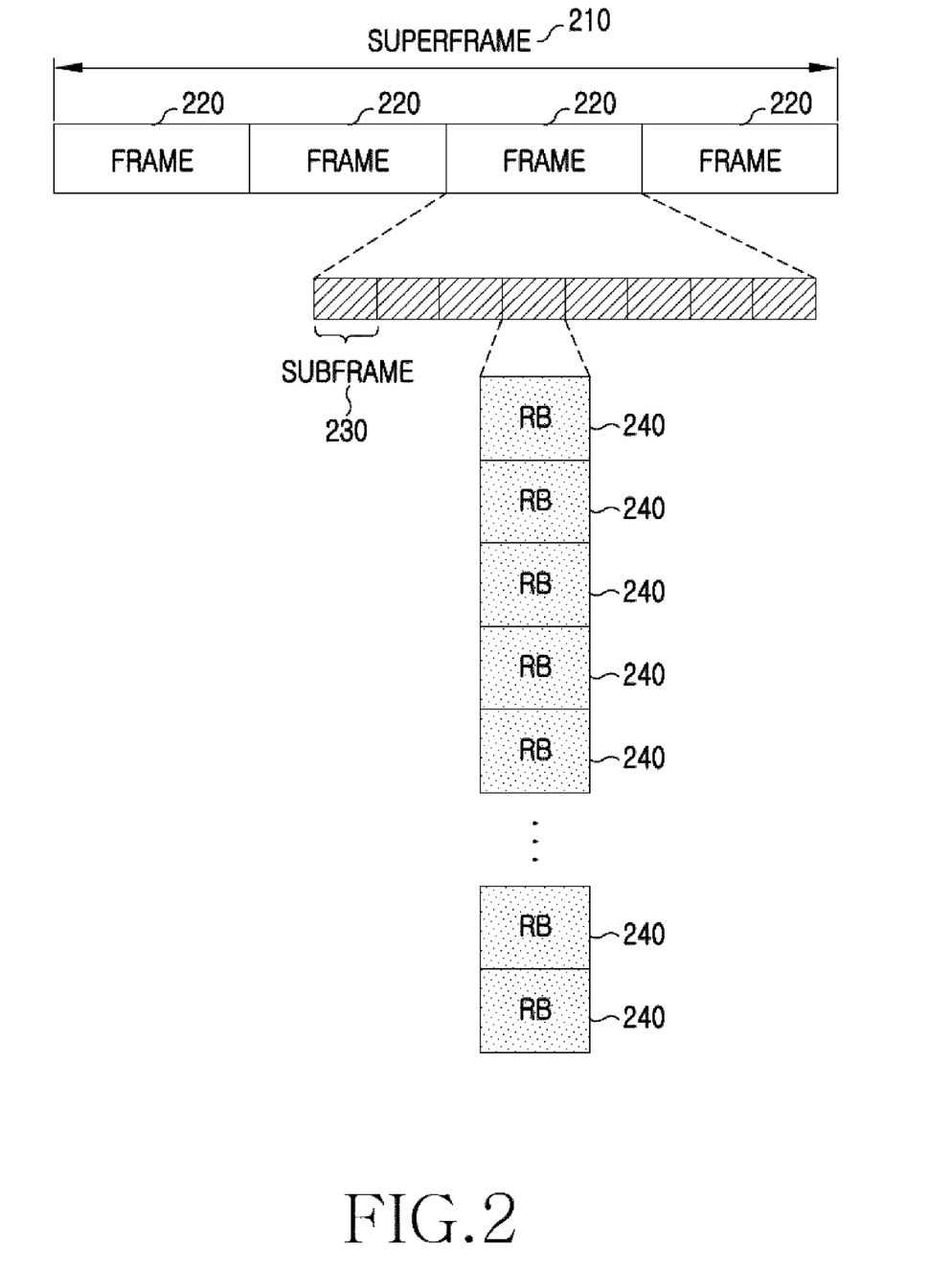
FIG. 2 illustrates a frame structure in a broadband wireless communication system according to an exemplary embodiment of the present invention.

A frame structure in a broadband wireless communication according to an exemplary embodiment of the present invention is illustrated in FIG. 2.

A plurality of frames 220 builds one superframe 210 in FIG. 2. Each frame 220 includes a plurality of subframes 230. Each subframe 230 includes a plurality of OFDMA symbols. The resource allocation targets resources in the subframe 230 based on a Resource Block (RB) 240. That is, a terminal communicating with a base station is allocated an integral number of RBs.

Accordingly, a MAP message is transmitted per subframe 230. MAP Information Elements (IEs) indicative of the resource allocation results in the MAP message pass through a Cyclic Redundancy Check (CRC) using a particular sequence allocated to the terminal that is to receive the MAP IE. The terminal determines whether the MAP IE is destined for itself by CRC-processing the MAP IE with its allocated sequence. This MAP IE coding is referred to as a separate coding.

To relocate the persistently allocated resource, it is necessary to recognize the terminal which uses the persistently allocated resource and to shift the resource allocated to the terminal to a new location. The base station needs to inform the terminal of the new resource location. In so doing, to reduce the amount of information indicative of the resource relocation, the broadband wireless communication system of an exemplary embodiment of the present invention utilizes a fixed allocation type and an RB offset.

The fixed allocation type indicates a type of the fixed allocation, and is used to indicate the type of the relocated resource. For example, the fixed allocation type is used to distinguish a Voice over Internet Protocol (VoIP) fixed allocation and a synchronous Hybrid Automatic Repeat reQuest (HARQ) fixed allocation. Since the resource collision occurs between at least two resources of the different fixed allocations, information indicative of which one of the two resources is relocated is required. To this end, the fixed allocation type is used. Notably, when the resource to relocate is predefined between the base station and the terminal, the fixed allocation type can be omitted. For example, in the resource collision, the relocation of the resource according to the VoIP fixed allocation can be designated in advance.

The RB offset indicates a start point of the allocated resource, and is used to identify the resource. To relocate the resource, identification information of the resource to shift and information indicative of the resource location after the relocation are required. The information for the resource identification can be represented in various forms. When only the relocation of the resource is under consideration, it is sufficient that the resource identification information indicates merely the location of the resource to relocate. In addition, the RB offset is used to indicate the location of the resource after the relocation.

The resource relocation IE indicative of the resource relocation includes at least one of the fixed allocation type indicative of the allocation scheme of the resource to move, an allocated RB offset indicative of the location before the relocation, and a new RB offset indicative of the location after the relocation.

The resource relocation using the resource relocation IE including the above-mentioned items is described below in more detail. Hereafter, a synchronous HARQ fixed allocation resource indicates the persistently allocated resource for transmitting the synchronous HARQ packet, and a VoIP fixed allocation resource indicates the resource persistently allocated resource for transmitting the VoIP packet.

Figure 3:
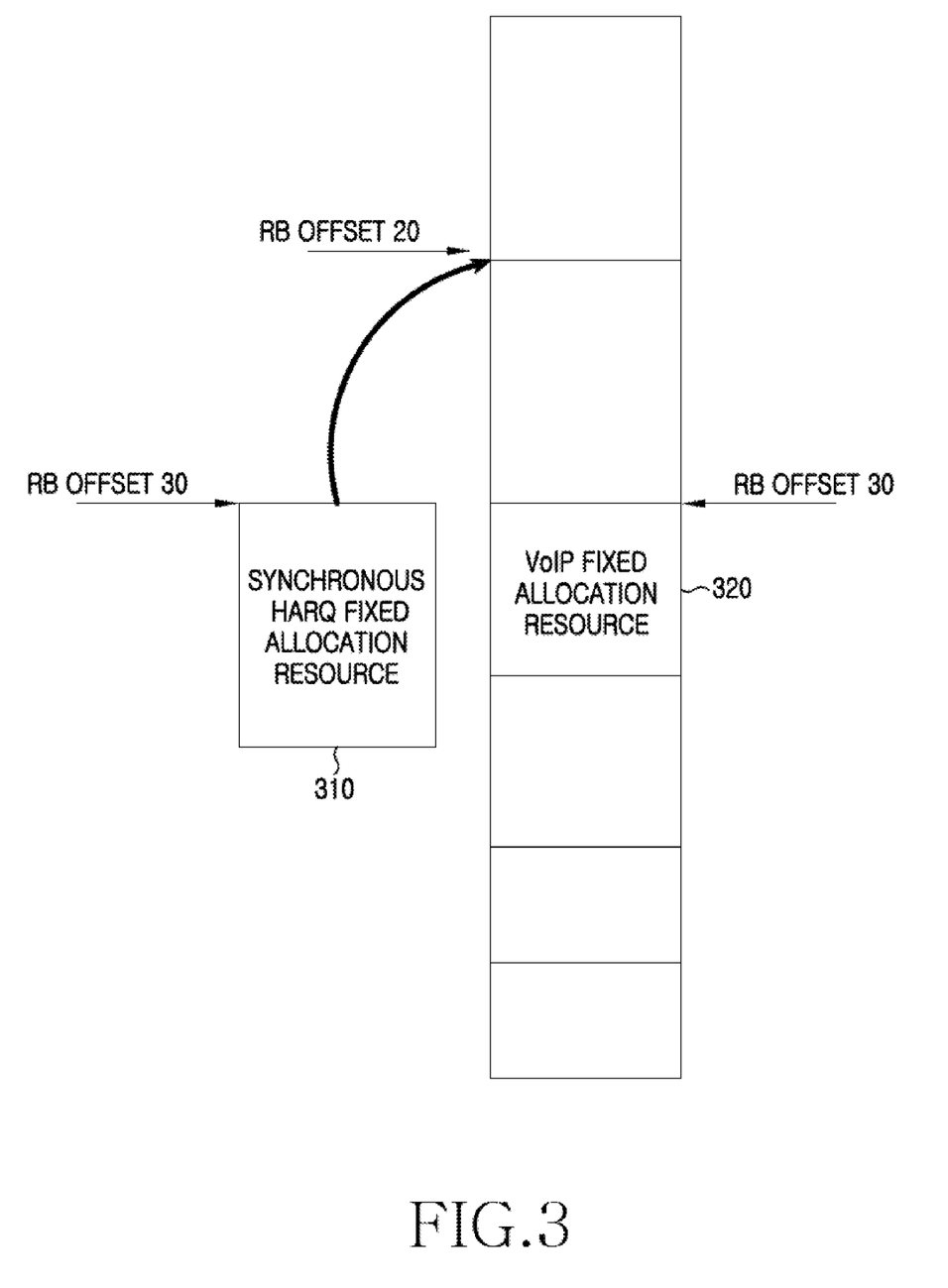
FIG. 3 illustrates resource relocation to avoid resource collision in a broadband wireless communication system according to an exemplary embodiment of the present invention.

FIG. 3 illustrates resource relocation to avoid resource collision in a broadband wireless communication system according to an exemplary embodiment of the present invention.

Referring to FIG. 3, the synchronous HARQ fixed allocation resource 310 collides with the VoIP fixed allocation resource 320, and the RB offset of the synchronous HARQ fixed allocation resource 310 and the RB offset of the VoIP fixed allocation resource 320 both are 30. It is assumed that the HARQ fixed allocation is expressed as '1' and the VoIP fixed allocation is expressed as '0'. To shift the synchronous HARQ fixed allocation resource 320 to the location of the RB offset 20, the resource relocation IE including the fixed allocation type set to '1', the allocated RB offset set to '30', and the new RB offset set to '20' is transmitted. When one subframe includes N-ary RBs, the allocated RB offset and the new RB offset are in the size of ⌈ $\log_2 N$ ⌉ bits and the fixed allocation type is in the size of 1 bit. For example, when the subframe includes 48 RBs, the fixed allocation type is 1 bit, the allocated RB offset is 6 bits, and the new RB offset is 6 bits. As a result, the size of the resource relocation IE is 13 bits.

Multiple resource relocation information can be contained in a single resource relocation IE. To shift the N-ary persistently allocated resources in the system using the separate coding, N-ary resource relocation IEs are required. However, when the N-ary resource relocation information is contained in the single resource relocation IE, the amount of the required information can be reduced. In this case, the resource relocation IE further includes the number of relocations indicative of the number of the resource relocation information contained in the resource relocation IE. The resource relocation IE including the multiple resource relocation information is coded and modulated based on the resource of the worst channel status among the N-ary resources persistently allocated. For example, the resource relocation IE may be constituted as shown in Table 1.

TABLE 1

| Syntax | Size (bits) | Notes |
|---|---|---|
| Resource Relocation IE{ | | |
|   Type | 5 | |
|   N Relocation | 3 | The number of persistently allocated resources to relocate |
|   for(j=0;j<Number of relocation; j++){ | | |
|     Fixed allocation type | 1 | 0: VoIP resource 1: synchronous HARQ resource |
|     Allocated RB offset | 6 | Start point of the persistently allocated resource to relocate |
|     New RB offset | 6 | New start point of the persistently allocated resource |
|   } | | |
|   CRC | 16 | |
| } | | |

Since the resource relocation IE is transmitted in the form of the MAP, the resource relocation IE includes a type to distinguish the type of the MAP. An N relocation bit indicative of the number of the persistently allocated resources is included. For each resource relocation, the fixed allocation type, the allocated RB offset, and the new RB offset bit are included. The information of the fixed allocation type, the allocated RB offset, and the RB offset bit is contained as many times as the value of the N relocation. CRC for the resource relocation IE is included. The value of the CRC is set to a common CRC code which is known to all of the terminals receiving the resource relocation IE.

The resource relocation IE as described above is used to avoid the collision between the persistently allocated resources. Yet, regardless of the collision, the resource relocation IE can be used to relocate the persistently allocated resources.

Figure 4A:
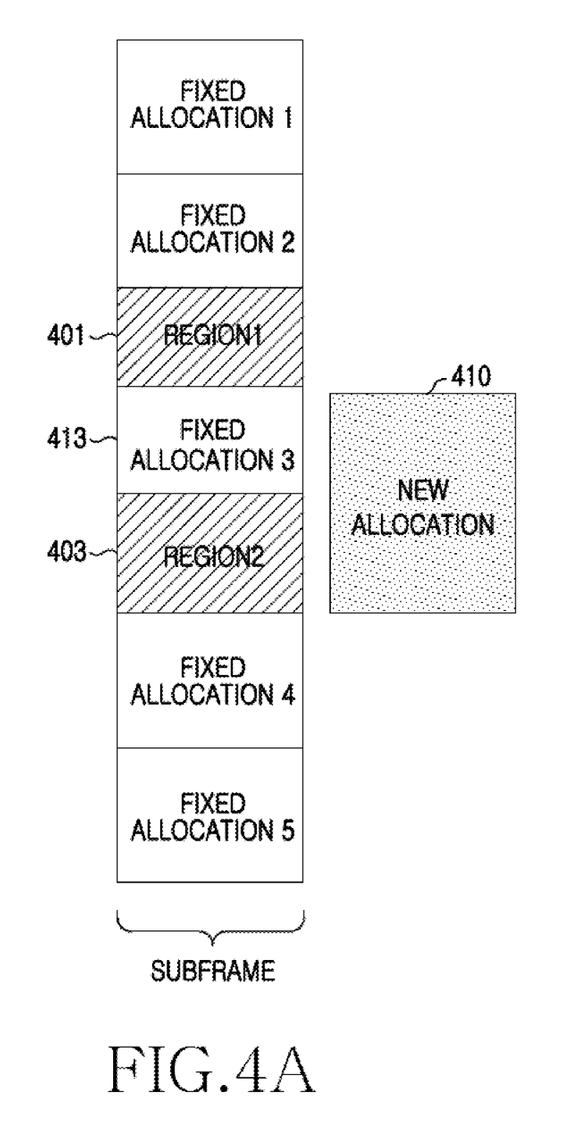
FIG. 4 illustrates resource relocation to add new allocation in a broadband wireless communication system according to an exemplary embodiment of the present invention.
Figure 4B:
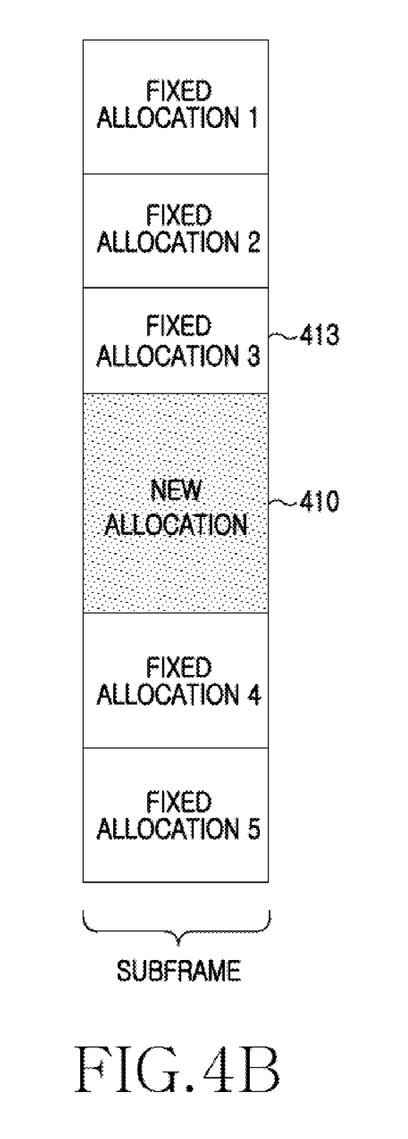

For instance, the allocation release of the persistently allocated resource can lead to an empty allocation region such as a first region 401 and a second region 403 as illustrated in FIG. 4A. FIG. 4 illustrates resource relocation to add new allocation in a broadband wireless communication system according to an exemplary embodiment of the present invention. To address the empty allocation region caused by the allocation release of the persistently allocated resource, the fixed allocations are positioned discontinuously. When a new allocation 410 is added, the resource size required for the new allocation 410 is not equal to or smaller than the first region 401 or the second region 402 and thus is not allocated to the first region 401 or the second region 402. Such an empty allocation region out of use causes the waste of the resources and decreases system capacity. In this respect, by relocating the fixed allocations using the resource relocation IE of the present invention, the first region 401 and the second region 402 can be removed. As illustrated in FIG. 4B, the base station moves the third fixed allocation 413 to the start point of the first region 401 and then adds the new allocation 410 to one empty resource region. The base station informs the terminal using the third fixed allocation 413 of the resource relocation using the resource relocation IE of Table 1.

As stated above, the resource relocation of an exemplary embodiment of the present invention is carried out in the case where the persistently allocated resources collide with each other and in the case where there are no continuous resource regions for the new resource allocation.

Figure 5:
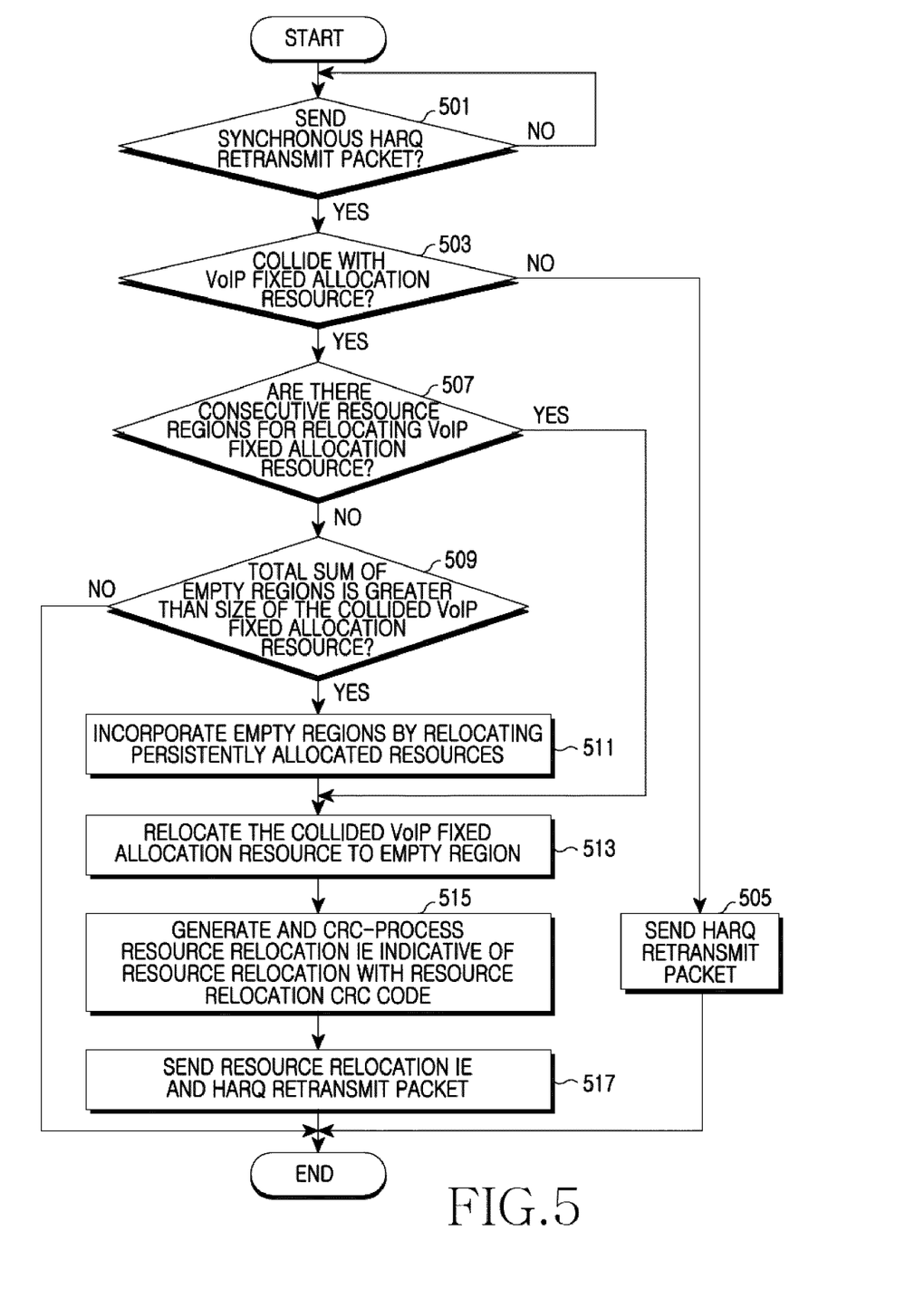
FIG. 5 illustrates operations of a base station for preventing resource collision in a broadband wireless communication system according to an exemplary embodiment of the present invention.

FIG. 5 illustrates operations of the base station for preventing resource collision in a broadband wireless communication system according to an exemplary embodiment of the present invention.

Referring to FIG. 5, in step 501, the base station determines whether to transmit the synchronous HARQ retransmit packet. In other words, the base station determines whether the reception of the synchronous HARQ initial transmit packet or the synchronous HARQ retransmit packet sent in the previous frame fails. When the reception has failed, the base station determines to send the synchronous HARQ retransmit packet.

When the synchronous HARQ retransmit packet is to be sent, the base station determines whether the synchronous HARQ fixed allocation resource for sending the synchronous HARQ retransmit packet collides with the VoIP fixed allocation resource in step 503. That is, the base station determines whether part or all of the persistently allocated resource for sending the synchronous HARQ retransmit packet overlaps with the VoIP fixed allocation resource.

When the synchronous HARQ fixed allocation resource does not collide with the VoIP fixed allocation resource, the base station sends the synchronous HARQ retransmit packet through the synchronous HARQ fixed allocation resource in step 505. More specifically, the base station sends the synchronous HARQ retransmit packet using the resource of the same location as the resource used for the synchronous HARQ packet transmitted in the previous frame.

When the synchronous HARQ fixed allocation resource collides with the VoIP fixed allocation resource, the base station determines whether there are consecutive resource regions for shifting the VoIP fixed allocation resource in step 507. That is, the base station determines whether there are empty resource regions of the same size as the VoIP fixed allocation resource within the corresponding subframe. If there are consecutive resource regions to relocate the VoIP fixed allocation resource, the base station proceeds to step 513.

In contrast, when there are no consecutive resource regions for relocating the VoIP fixed allocation resource, the base station determines whether the total sum of the empty resource regions is greater than the collided VoIP fixed allocation resource in step 509. In more detail, the base station incorporates all of the empty resource regions of the corresponding subframe and determines whether the region for relocating the VoIP fixed allocation resource can be supplied. When the total sum of the empty resource regions is less than the size of the VoIP fixed allocation resource, the base station cannot send the synchronous HARQ retransmit packet and finishes this process.

When the total sum of the empty resource regions is greater than the size of the VoIP fixed allocation resource, the base station incorporates the empty resource regions by relocating the persistently allocated resources in step 511. That is, the base station supplies the region for relocating the VoIP fixed allocation resource by combining all of the empty resource regions of the corresponding subframe.

In step 513, the base station moves the collided VoIP fixed allocation resource to the empty resource regions. The base station determines to send the VoIP packet using the VoIP fixed allocation resource, over the empty resource regions.

Hence, the synchronous HARQ retransmit packet can be transmitted without the resource collision.

In step 515, the base station generates the resource relocation IE indicative of at least one resource relocation and CRC-processes the resource relocation IE with the resource relocation CRC code. Namely, the base station generates the resource relocation IE including the resource offset of the relocated resource and the resource offset after the relocation. When the step 511 is performed, the base station generates the resource relocation IE indicative of the resource relocation for combining the empty regions and the resource relocation for avoiding the collision. In contrast, when step 511 is not performed, the base station generates the resource relocation IE indicative of the resource relocation for avoiding the collision. For example, the base station generates and CRC-processes the resource relocation IE including the parameters of Table 1.

In step 517, the base station transmits the resource relocation IE and the HARQ retransmit packet. In so doing, the base station modulates and converts the resource relocation IE and the HARQ retransmit packet into complex symbols, converts the complex symbols into OFDM symbols through Inverse Fast Fourier Transform (IFFT) operation and Cyclic Prefix (CP) insertion, up-converts the OFDM symbols into a Radio Frequency (RF) signal, and then transmits the RF signal over an antenna.

In FIG. 5, when the synchronous HARQ fixed allocation resource collides with the VoIP fixed allocation resource, the VoIP fixed allocation resource is relocated. Alternatively, the synchronous HARQ fixed allocation resource can be relocated. In this case, the base station determines whether there are consecutive resource regions for relocating the synchronous HARQ fixed allocation resource in step 507. Upon detecting the consecutive resource regions, the base station shifts the synchronous HARQ fixed allocation resource. When detecting no consecutive resource regions, the base station acquires the empty region for relocating the synchronous HARQ fixed allocation resource by incorporating the empty regions. When the empty region for the synchronous HARQ fixed allocation resource is insufficient even through the incorporation of the empty regions, the base station does not send the VoIP packet using the VoIP fixed allocation resource.

Figure 6:
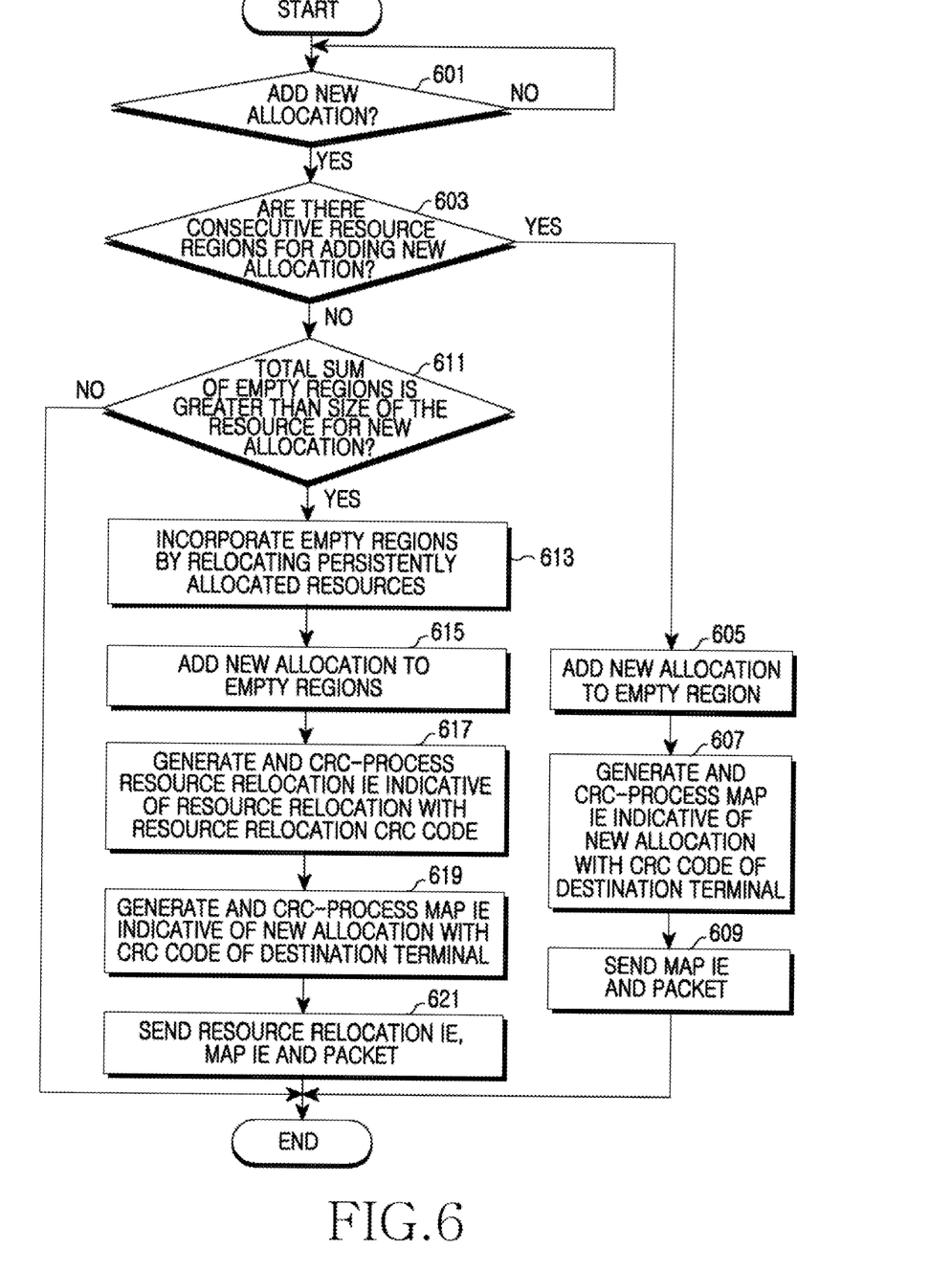
FIG. 6 illustrates operations of a base station for adding a new allocation in a broadband wireless communication system according to an exemplary embodiment of the present invention.

FIG. 6 illustrates operations of a base station for adding a new allocation in a broadband wireless communication system according to an exemplary embodiment of the present invention.

Referring to FIG. 6, in step 601, the base station determines whether it is necessary to add a new allocation. The new allocation can be the fixed allocation or a general allocation.

When the new allocation is to be added, the base station determines whether there are consecutive resource regions for adding the new allocation in step 603. That is, the base station determines whether there are empty resource regions in a size greater than or equal to the resource required for the new allocation in the corresponding subframe.

When detecting the consecutive resource regions for adding the new allocation, the base station adds the new allocation into the empty resource regions in step 605. Namely, the base station allocates the resources of the empty resource regions to the terminal which requires the new allocation.

In step 607, the base station generates the MAP IE indicative of the new allocation and CRC-processes the MAP IE with the CRC code of the destination terminal.

In step 609, the base station transmits the MAP IE and the corresponding packet. The base station modulates and converts the MAP IE and the packet into complex symbols, converts the complex symbols into OFDM symbols through the IFFT operation and the CP insertion, up-converts the OFDM symbols into an RF signal, and then transmits the RF signal over the antenna.

When there are no consecutive resource regions for adding the new allocation in step 603, the base station determines whether the total sum of the empty resource regions is greater than the size of the resources required for the new allocation in step 611. In more detail, the base station incorporates all of the empty resource regions of the corresponding subframe and determines whether the resource regions for the anew allocation can be supplied. When the total sum of the empty resource regions is less than the size of the resources for the new allocation, the base station cannot add the new allocation and finishes this process.

When the total sum of the empty resource regions is greater than the resource size of the new allocation, the base station incorporates the empty resource regions by relocating the persistently allocated resources in step 613. That is, the base station supplies the resource regions for adding the new allocation by combining all of the empty resource regions of the corresponding subframe.

In step 615, the base station adds the new allocation to the empty resource regions. That is, the base station allocates the resources of the empty resource regions to the terminal which requires the new allocation.

In step 617, the base station generates the resource relocation IE indicative of the resource relocation and CRC-processes the resource relocation IE with the resource relocation CRC code. That is, the base station generates the resource relocation IE including the resource offset of the relocated resource and the resource offset after the relocation. For example, the base station generates the resource relocation IE including the parameters of Table 1 and then CRC-processes the resource relocation IE.

In step 619, the base station generates the MAP IE indicative of the new allocation and CRC-processes the MAP IE with the CRC code of the destination terminal of the MAP IE.

In step 621, the base station transmits the resource relocation IE, the MAP IE, and the corresponding packet. The base station modulates and converts the resource relocation IE, the MAP IE, and the packet into complex symbols, converts the complex symbols into OFDM symbols through the IFFT operation and the CP insertion, up-converts the OFDM symbols into an RF signal, and then transmits the RF signal over the antenna.

Figure 7:
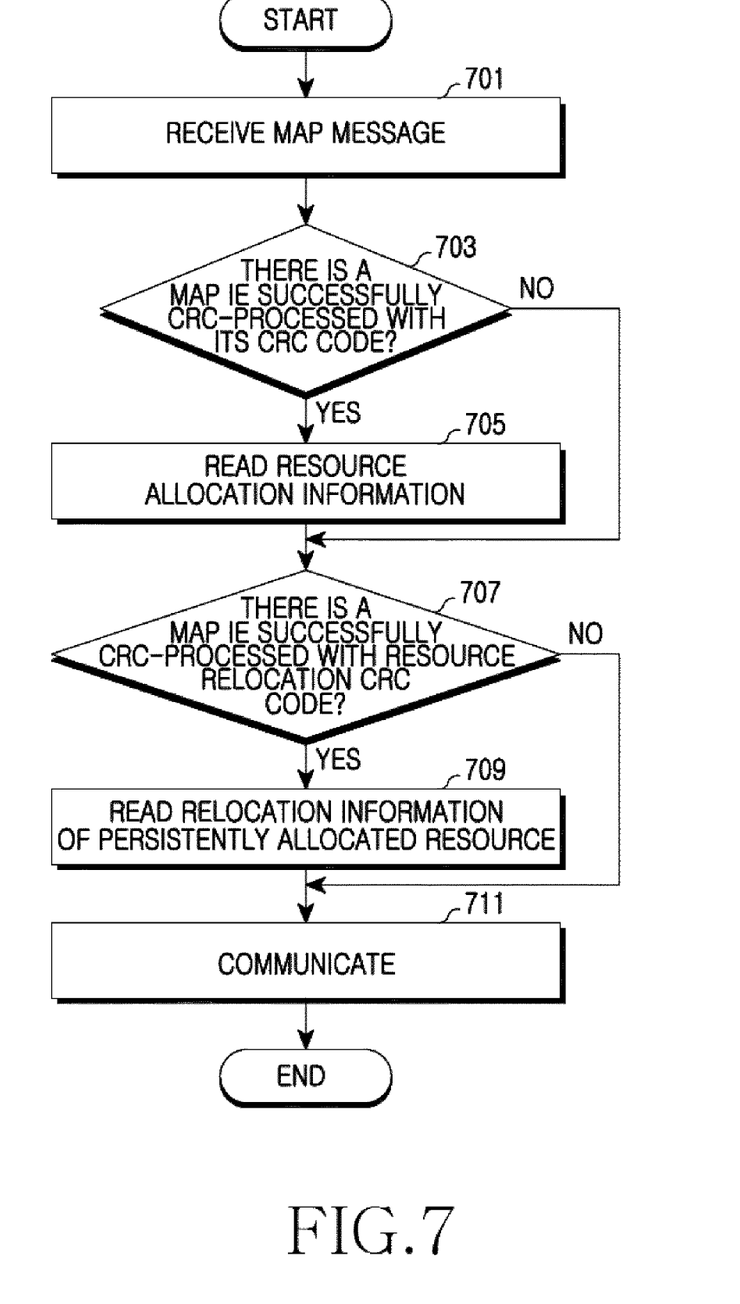
FIG. 7 illustrates operations of a terminal in a broadband wireless communication system according to an exemplary embodiment of the present invention.

FIG. 7 illustrates operations of a terminal in a broadband wireless communication system according to an exemplary embodiment of the present invention.

Referring to FIG. 7, in step 701, the terminal receives a MAP message. Herein, the MAP message includes at least one of the MAP IE and the resource relocation IE, and can include a plurality of the MAP IEs or a plurality of the resource relocation IEs. The terminal down-converts the RF signal received via an antenna into a baseband signal, divides the baseband signal into OFDM symbols, restores the frequency band signals using the CP elimination and the FFT operation, and converts the signals mapped to the location of the MAP message to a bit stream.

In step 703, the terminal determines whether there is an IE successfully CRC-processed with its CRC code. That is, the terminal divides the MAP message on an IE basis and CRC-processes the IEs with its CRC code. Next, the terminal determines whether there is a MAP IE without error, according to the result of the CRC processing. That is, the terminal determines whether there is a MAP IE for the terminal. When detecting that there is no IE successfully CRC-processed with its CRC code, the terminal proceeds to step 707.

In contrast, when detecting a MAP IE successfully CRC-processed with its CRC code, the terminal reads its resource allocation information in step 705. In more detail, the terminal determines that the MAP IE successfully CRC-processed with its CRC code as its MAP IE and reads the resource allocation information contained in its MAP IE.

In step 707, the terminal determines whether there is an IE successfully CRC-processed with a resource relocation CRC code. More specifically, the terminal divides the MAP message on an IE basis and CRC-processes the IEs with the resource relocation CRC code. Next, based on the result of the CRC processing, the terminal determines whether there is an IE without error. That is, the terminal determines whether there is a resource relocation IE. When detecting that there is no IE successfully CRC-processed with the resource relocation CRC code, the terminal proceeds to step 711.

In contrast, when detecting that the MAP IE is successfully CRC-processed with the resource relocation CRC code, the terminal reads the relocation information of the persistently allocated resource in step 709. In more detail, the terminal determines that the MAP IE is successfully CRC-processed with the resource relocation CRC code as the MAP IE indicative of the resource relocation and reads the resource relocation information contained in the MAP IE indicative of the resource IE. For example, the resource relocation IE may be constituted as shown in Table 1.

In step 711, the terminal communicates according to the read resource allocation information or the read resource relocation information. When there is resource allocation information for the terminal, the terminal receives the packet through the newly allocated resource indicated by the resource allocation information. When there is resource relocation information, the terminal determines whether the relocated resource is allocated to itself. When the resource relocation information is allocated to itself, the terminal receives the packet through the relocated resource. The terminal determines whether the relocated resource is allocated to itself by comparing the value of the allocated RB offset of the resource relocation IE with the offset of its persistently allocated resource. When the value of the allocated RB offset of the resource relocation IE is equal to the offset of the persistently allocated resource of the terminal, the terminal determines the relocation of its allocated resource and communicates using the resource indicated by the value of the new RB offset of the resource relocation IE.

Figure 8:
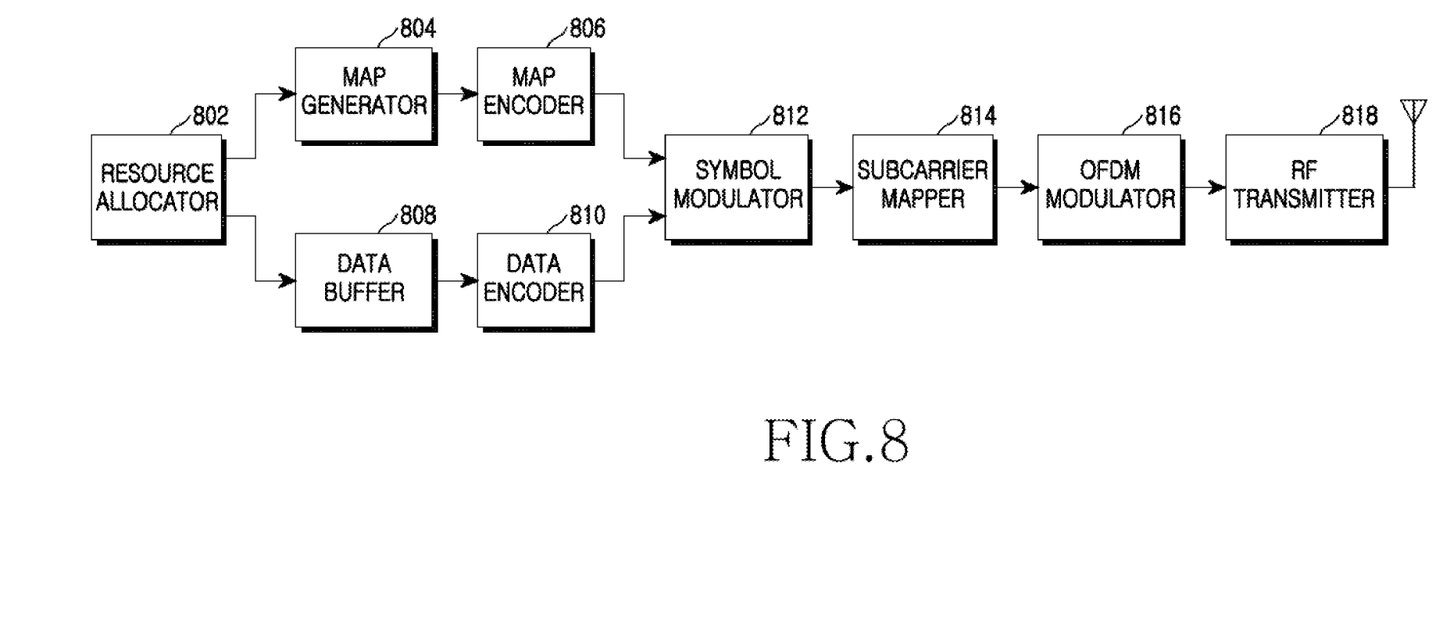
FIG. 8 illustrates a base station in a broadband wireless communication system according to an exemplary embodiment of the present invention.

FIG. 8 is a block diagram of a base station in a broadband wireless communication system according to an exemplary embodiment of the present invention.

Referring to FIG. 8, the base station includes a resource allocator 802, a MAP generator 804, a MAP encoder 806, a data buffer 808, a data encoder 810, a symbol modulator 812, a subcarrier mapper 814, an OFDM modulator 816, and an RF transmitter 818.

The resource allocator 802 allocates the resources to the terminals being connected to the base station. The resource allocator 802 conducts the resource allocation per subframe. That is, the resource allocator 802 allots the resources according the fixed allocation or the general allocation. In particular, the resource allocator 802 determines whether to relocate the persistently allocated resources and relocates the persistently allocated resources. For instance, when the persistently allocated resources collide with each other or when there are no consecutive empty resource regions as large as the resource size required for the new allocation addition, the resource allocator 802 determines to relocate the persistently allocated resources. In the collision, the resource allocator 802 moves one of the collided resources persistently allocated into the empty resource region. In the absence of consecutive empty resource regions that are large enough, the resource allocator 802 supplies the consecutive empty resource regions that are large enough by relocating the persistently allocated resources. That is, the resource allocator 802 supplies the consecutive empty resource regions by incorporating the empty resource regions in the subframe. The resource allocator 802 then shifts the persistently allocated resource into the supplied empty resource regions. When there are no consecutive empty resource regions that are large enough for the new allocation addition, the resource allocator 802 supplies the consecutive empty resource regions that are large enough for the new allocation by relocating the persistently allocated resources, and adds the new allocation to the supplied empty resource regions. Herein, the persistently allocated resource includes the synchronous HARQ fixed allocation resource and the VoIP fixed allocation resource.

The MAP generator 804 generates the MAP message to inform of the resource allocation result of the resource allocator 802. Herein, the MAP message includes at least one of the MAP IE and the resource relocation IE, and can include the plurality of the MAP IEs or the plurality of the resource relocation IEs. The MAP IE and the resource relocation IE conform to a predefined IE format. In particular, when generating the resource relocation IE, the MAP generator 804 generates the resource relocation IE including the resource offset of the relocated resource and the resource offset after the relocation. For example, the base station generates the resource relocation IE including the parameters of Table 1.

The MAP encoder 806 CRC-processes the MAP IE and the resource relocation IE with the corresponding CRC code. The MAP encoder 806 CRC-processes the MAP IE with the CRC code of the destination terminal of the MAP IE, and CRC-processes the resource relocation IE with the resource relocation CRC code. Accordingly, the MAP IE can be decoded only by the destination terminal of the MAP IE, and the resource relocation IE can be decoded by any terminal which knows the resource relocation CRC code.

The data buffer 808 stores data to be transmitted to the terminals, and provides the stored data to the data encoder 810 according to the resource allocation result of the resource allocator 802. The data encoder 810 channel-encodes the data bit stream output from the data buffer 808. The symbol modulator 812 modulates and converts the channel-encoded bit stream into the complex symbols. The subcarrier mapper 814 maps the complex symbols into the frequency domain according to the resource allocation result of the resource allocator 802. The OFDM modulator 816 converts the complex symbols mapped to the frequency domain into a time-domain signal using the IFFT, and constitutes OFDM symbols by inserting a CP. The RF transmitter 818 up-converts the baseband signal into the RF signal and transmits the RF signal via the antenna.

Figure 9:
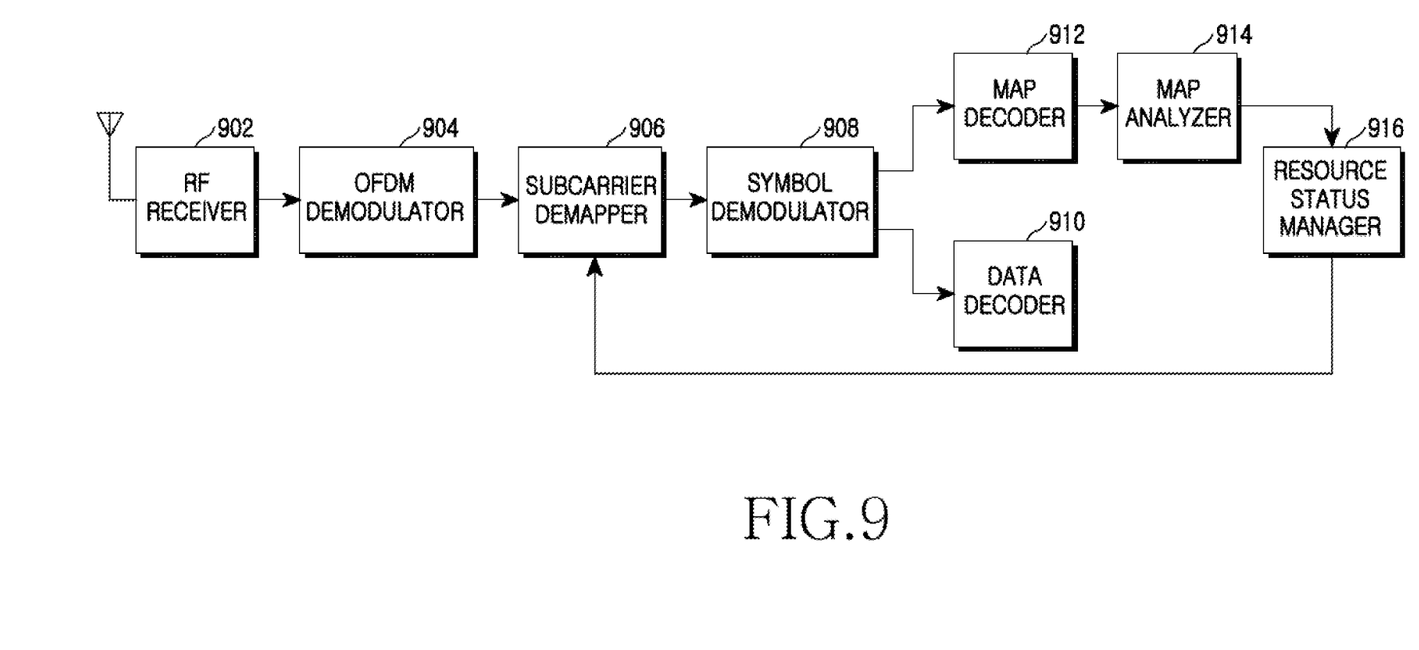
FIG. 9 illustrates a terminal in a broadband wireless communication system according to an exemplary embodiment of the present invention.

FIG. 9 is a block diagram of a terminal in a broadband wireless communication system according to an exemplary embodiment of the present invention.

Referring to FIG. 9, the terminal includes an RF receiver 902, an OFDM demodulator 904, a subcarrier demapper 906, a symbol demodulator 908, a data decoder 910, a MAP decoder 912, a MAP analyzer 914, and a resource status manager 916.

The RF receiver 902 down-converts the RF signal received via the antenna into a baseband signal. The OFDM demodulator 904 divides the signal output from the RF receiver 902 on the OFDM symbol basis, removes the CP, and restores the complex symbols mapped to the frequency domain using the FFT. The subcarrier demapper 906 extracts the signal mapped to the resource allocated to the terminal from the complex symbols mapped to the frequency domain. The symbol demodulator 908 demodulates and converts the complex symbols into the bit stream. The symbol demodulator 908 provides the coded bit stream of the data to the data decoder 910 and provides the bit stream of the MAP message to the MAP decoder 912. The data decoder 910 restores the data bit stream by channel-decoding the bit stream output from the symbol demodulator 908.

The MAP decoder 912 divides the bit stream of the MAP message on the IE basis and distinguishes the MAP IE for the terminal and the resource relocation IE indicative of the resource relocation from the IEs. In more detail, the MAP decoder 912 CRC-processes the IEs with the CRC code of the terminal, and determines an IE having no error as the MAP IE for the terminal according to the result of the CRC processing. The MAP decoder 912 CRC-processes the IEs with the resource relocation CRC code and determines the IE having no error as the resource relocation IE according to the result of the CRC processing.

The MAP analyzer 914 reads the resource allocation information contained in the MAP IE for the terminal and the resource relocation information contained in the resource relocation IE as read by the MAP decoder 912. The MAP analyzer 914 reads the newly allocated resource from the MAP IE and the relocation information of the persistently allocated resource from the resource relocation IE based on the predefined IE format. For example, the resource relocation IE may be constituted as shown in Table 1.

The resource status manager 916 manages the status of the resource allocated to the terminal according to the resource allocation information and the resource relocation information read by the MAP analyzer 914. The resource status manager 916 controls the subcarrier demapper 906 to extract the signal received through the resource allocated to the terminal. When the resource relocation IE is received, the resource status manager 916 determines whether the relocated resource is the resource of the terminal. When the terminal's resource is relocated, the resource status manager 916 updates the resource status information of the terminal. The resource status manager 916 determines whether the relocated resource is the resource allocated to the terminal by referring to the allocated RB offset parameter of the resource relocation IE. More specifically, the resource status manager 916 compares the value of the allocated RB offset with the offset of the terminal resource. When the value of the allocated RB offset is equal to the offset of the terminal resource, the resource status manager 916 determines that the terminal's resource is shifted to the location of the new RB offset.

In the broadband wireless communication system according to exemplary embodiments of the present invention, the relocation of the persistently allocated resource is informed using the resource relocation information including the start point of the resource before the relocation, the start point of the resource after the relocation, and the type of the relocated resource. Therefore, the persistently allocated resource can be relocated with minimum overhead and efficiency of the resource utilization can be increased.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a base station in a wireless communication system, the method comprising:
   detecting a collision between fixed allocation resources;
   relocating one of the fixed allocation resources; generating a resource relocation Information Element (IE) indicative of the resource relocation using at least one offset of at least one Resource Block (RB); and
   transmitting the resource relocation IE,
   wherein the resource relocation IE comprises a first parameter indicative of a location of the relocated resource using the offset of the RB, a second parameter indicative of a location after the relocation using the offset of the RB, and a third parameter indicative of a fixed allocation to be relocated.
   wherein determining of whether to relocate the at least one persistently allocated resource comprises:
   determining whether there are consecutive empty resource regions large enough in a size for a new allocation; and
   when there are no consecutive empty resource regions large enough in size for the new allocation, determining to relocate the at least one persistently allocated resource.

2. The method of claim 1, wherein the RB comprises a unit of resource allocation and is disposed within a subframe, and the resource relocation IE indicates the resource relocation within the subframe.

3. The method of claim 2, wherein the resource relocation IE further comprises a fourth parameter indicative of the number of the resource relocations indicated by the resource relocation IE.

4. The method of claim 3, further comprising:
   Cyclic Redundancy Check (CRC)-processing the resource relocation IE using a resource relocation CRC code.

5. The method of claim 4, wherein the determining of whether to relocate the at least one persistently allocated resource comprises:
   when transmitting a synchronous Hybrid Automatic Repeat reQuest (HARQ) retransmit packet, determining whether a synchronous HARQ fixed allocation resource for delivering the synchronous HARQ retransmit packet collides with a Voice over Internet Protocol (VoIP) fixed allocation resource; and
   when the synchronous HARQ fixed allocation resource collides with the Voice over Internet Protocol (VoIP) fixed allocation resource, determining to relocate the VoIP fixed allocation resource.

6. The method of claim 5, wherein the relocating of the at least one persistently allocated resource comprises:
   when there are consecutive empty resource regions in a size greater than or equal to a size of the VoIP fixed allocation resource, relocating the VoIP fixed allocation resource to the empty resource regions.

7. The method of claim 5, wherein the relocating of the at least one persistently allocated resource comprises:
   when there are no consecutive empty resource regions in a size greater than or equal to the size of the VoIP fixed allocation resource, supplying empty resource regions by relocating at least one persistently allocated resource excluding the VoIP fixed allocation resource; and
   relocating the VoIP fixed allocation resource to the supplied empty resource regions.

8. The method of claim 4, wherein the relocating of the at least one persistently allocated resource comprises:
   relocating the at least one persistently allocated resource to supply the empty resource regions in a large enough size for the new allocation.

9. An operating method of a terminal in a wireless communication system, the method comprises:
   determining whether a MAP message comprises a resource relocation Information Element (IE) indicative of a resource relocation using at least one offset of at least one Resource Block (RB);
   reading resource relocation information of at least one persistently allocated resource using the resource relocation IE; and
   determining whether the persistently allocated resource being relocated is a resource of the terminal,
   wherein the resource relocation IE comprises a first parameter indicative of a location of the relocated resource using the offset of the RB, a second parameter indicative of a location after the relocation using the offset of the RB, and a third parameter indicative of a fixed allocation to be relocated;
   wherein the determining of whether to relocate the at least one persistently allocated resource comprises:
   determining whether there are consecutive empty resource regions large enough in a size for a new allocation; and
   when there are no consecutive empty resource regions large enough in size for the new allocation, determining to relocate the at least one persistently allocated resource.

10. The method of claim 9, wherein the RB comprises a unit of resource allocation and is disposed within a subframe, and
    the resource relocation IE indicates the resource relocation within the subframe.

11. The method of claim 10, wherein the resource relocation IE further comprises a fourth parameter indicative of the number of the resource relocations indicated by the resource relocation IE.

12. The method of claim 11, wherein the determining of whether the MAP message comprises the resource relocation IE comprises:
    Cyclic Redundancy Check (CRC)-processing IEs of the MAP message using a resource relocation CRC code; and
    determining an IE successfully CRC-processed as the resource relocation IE.

13. The method of claim 2, wherein the determining of whether the persistently allocated resource being relocated is the resource of the terminal comprises:
    comparing a value of the first offset with an offset of the resource of the terminal; and
    when the value of the first offset is equal to the offset of the resource of the terminal, determining that the resource of the terminal is relocated to a position of the second offset.

14. An apparatus of a base station in a wireless communication system, the apparatus comprising:
    an allocator for detecting a collision between fixed allocation resources, and for relocating one of the fixed allocation resources;
    a generator for generating a resource relocation Information Element (IE) indicative of the resource relocation using at least one offset of at least one Resource Block (RB); and
    a transmitter for transmitting the resource relocation IE,
    wherein the resource relocation IE comprises a first parameter indicative of a location of the relocated resource using the offset of the RB, a second parameter indicative of a location after the relocation using the offset of the RB, and a third parameter indicative of a fixed allocation to be relocated;

wherein the determining of whether to relocate the at least one persistently allocated resource comprises:
  determining whether there are consecutive empty resource regions large enough in a size for a new allocation; and
  when there are no consecutive empty resource regions large enough in size for the new allocation, determining to relocate the at least one persistently allocated resource.

15. The apparatus of claim 14, wherein the RB comprises a unit of resource allocation and is disposed within a subframe, and
  the resource relocation IE indicates the resource relocation within the subframe.

16. The apparatus of claim 15, wherein the resource relocation IE further comprises a fourth parameter indicative of the number of the resource relocations indicated by the resource relocation IE.

17. The apparatus of claim 16, further comprising:
  an encoder for Cyclic Redundancy Check (CRC)-processing the resource relocation IE using a resource relocation CRC code.

18. The apparatus of claim 17, wherein, to transmit a synchronous Hybrid Automatic Repeat reQuest (HARQ) retransmit packet, the allocator determines whether a synchronous HARQ fixed allocation resource for delivering the synchronous HARQ retransmit packet collides with a Voice over Internet Protocol (VoIP) fixed allocation resource, and determines to relocate the VoIP fixed allocation resource when the synchronous HARQ fixed allocation resource collides with the Voice over Internet Protocol (VoIP) fixed allocation resource.

19. The apparatus of claim 18, wherein, when there are consecutive empty resource regions in a size greater than or equal to a size of the VoIP fixed allocation resource, the allocator relocates the VoIP fixed allocation resource to the empty resource regions.

20. The apparatus of claim 18, wherein, when there are no consecutive empty resource regions in the size greater than or equal to the size of the VoIP fixed allocation resource, the allocator supplies empty resource regions by relocating at least one persistently allocated resource excluding the VoIP fixed allocation resource, and relocates the VoIP fixed allocation resource to the supplied empty resource regions.

21. The apparatus of claim 17, wherein the allocator relocates the at least one persistently allocated resource to supply the empty resource regions in a large enough size for the new allocation.

22. An apparatus of a terminal in a wireless communication system, the apparatus comprises:
  a decoder for determining whether a MAP message comprises a resource relocation Information Element (IE) indicative of a resource relocation using at least one offset of at least one Resource Block (RB);
  an analyzer for reading resource relocation information of at least one persistently allocated resource using the resource relocation IE; and
  a manager for determining whether the persistently allocated resource being relocated is a resource of the terminal,
  wherein the resource relocation IE comprises a first parameter indicative of a location of the relocated resource using the offset of the RB, a second parameter indicative of a location after the relocation using the offset of the RB, and a third parameter indicative of a fixed allocation to be relocated;
  wherein the determining of whether to relocate the at least one persistently allocated resource comprises:
  determining whether there are consecutive empty resource regions large enough in a size for a new allocation; and
  when there are no consecutive empty resource regions large enough in size for the new allocation, determining to relocate the at least one persistently allocated resource.

23. The apparatus of claim 22, wherein the RB comprises a unit of resource allocation and is disposed within a subframe, and
  the resource relocation IE indicates the resource relocation within the subframe.

24. The apparatus of claim 23, wherein the resource relocation IE further comprises a fourth parameter indicative of the number of the resource relocations indicated by the resource relocation IE.

25. The apparatus of claim 24, wherein the decoder Cyclic Redundancy Check (CRC)-processes IEs of the MAP message using a resource relocation CRC code, and determines the IE successfully CRC-processed as the resource relocation IE.

26. The apparatus of claim 25, wherein the manager compares a value of the first offset with an offset of the resource of the terminal, and when the value of the first offset is equal to the offset of the resource of the terminal, determines that the resource of the terminal is relocated to a position of the second offset.

* * * * *